Feb. 29, 1944.  E. P. IRANY  2,343,061
CAPILLARY VISCOMETER
Filed Nov. 20, 1943

INVENTOR
ERNEST PAUL IRANY
By Alan Swabey
ATTORNEY

Patented Feb. 29, 1944

2,343,061

UNITED STATES PATENT OFFICE 2,343,061

CAPILLARY VISCOMETER

Ernest Paul Irany, Shawinigan Falls, Quebec, Canada

Application November 20, 1943, Serial No. 511,187
In Canada October 29, 1943

5 Claims. (Cl. 265—11)

INTRODUCTION

This invention relates to a capillary viscometer.

Capillary viscometers which are available in several standardized types are accurate if used within certain ranges of viscosity, depending on the dimensions of the capillary. Errors are due to influences which cause loss of energy, such as acceleration and deflection of the flowing liquid as well as the effects of surface tension. The former become very appreciable at fast rates of flow, i. e. with liquids of low viscosity; the latter prohibit the use of too narrow capillaries.

For these reasons, the accurate determination of low viscosities requires very elaborate apparatus and skillful time-consuming manipulations. Capillary viscometers of the usual design—for example, the Ostwald type pipette—fail to give correct readings of viscosities below about 1 centipoise. Due to the above-mentioned influences which tend to delay the passage of the liquid through the instrument, the computed viscosities are always too high and errors increase with the fluidity of the liquid.

Moreover, the usual type of capillary viscometer employing the out-flow principle embodies a tube of considerable length. This means that the instrument is far from compact and where it must be immersed in a bath to achieve a working temperature the entire equipment involved in the viscosity measurement becomes cumbersome.

OBJECTS

A principal object of the invention is the achievement of accuracy in the measurement of low viscosities. A further object of the invention is to provide a viscometer which is unusually compact for a given range. It is a still further object of the present invention to provide an inexpensive capillary viscometer which can be operated as easily as the conventional type of viscosity pipette but which can be used for the precise measurement of the lowest viscosities encountered in liquids. It is a further object to promote practical applications of viscometry in many fields of process and product control which heretofore were excluded because of the lack of a suitable instrument.

THE INVENTION

These and other objects of the invention are accomplished by a viscometer having a capillary of which the total length is substantially greater than the vertical distance between its terminals. This is accomplished according to a preferred structure in which the capillary has a spiral form.

The invention will be further understood by reference to the accompanying drawing, illustrating two forms of such preferred apparatus, in which.

Figure 1:
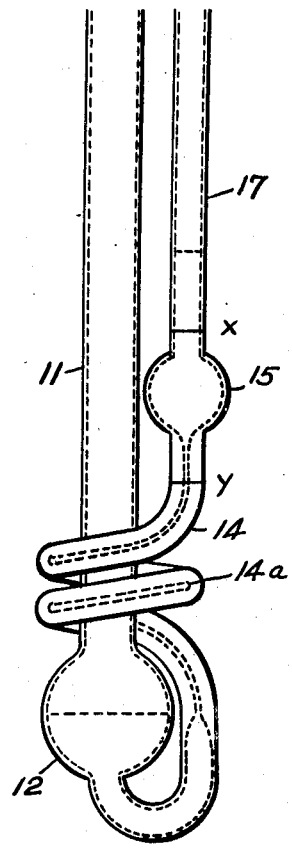
Figure 1 illustrates an instrument corresponding in capacity to the normal Ostwald type viscometer.

Referring more particularly to Figure 1 of the drawing, the instrument illustrated includes a straight glass tube 11 having a bulb 12 at the bottom thereof serving as a recipient vessel. Extending from the bulb 12 downwards and then upwards in the form of a helix or spiral is a tube 14 having a calibrated capillary 14a preferably of not less than .35 millimeter inside bore. The top end of this tube is provided with a feeder bulb 15 and extending upwards from the top of the bulb a tube 17. Just above the bulb 15 on the tube 17 is a measuring mark "$x$" and just below the bulb 15 on the tube 17 is a measuring mark "$y$." The capillary tube 14 is adapted to present a circumfluent path to liquid flowing from the bulb 15 towards the bulb 12. Preferably as indicated in the drawing, at least a portion of this path has an inclination of less than 45° towards the horizontal when the viscometer is in operative position.

Operation

A measured amount of liquid is introduced into the tube 11 and slight air or gas pressure applied thereto until the liquid rises in the capillary 14a through the bulb 15 and above the mark $x$ on the tube 17. The pressure is then removed and the liquid allowed to flow past the marks $x$ and $y$. The time of passage from the mark $x$ to the mark $y$ is registered. The viscosity is then found by comparing the outflow time with that of a liquid of known viscosity. It is to be observed that the volumes of the upper bulb 17 of the capillary and of the lower bulb 12 must be so related that, by using a convenient amount of liquid, the lower meniscus remain within, and near the center of, the lower bulb 12. It is also seen that the circuitous form of the capillary tube presents a circumfluent path to the liquid.

A viscometer as described, having a capillary of about the same inside diameter as that used in the standard type Ostwald pipette, and having about the same outflow time, would require only one-half of the height of the latter with only a negligible increase in lateral dimension. This compact construction would effect even far greater economy in the size of the thermostatic bath, reducing the necessary volume of the latter to about one-fifth or less.

ALTERNATE FORM

Figure 2:
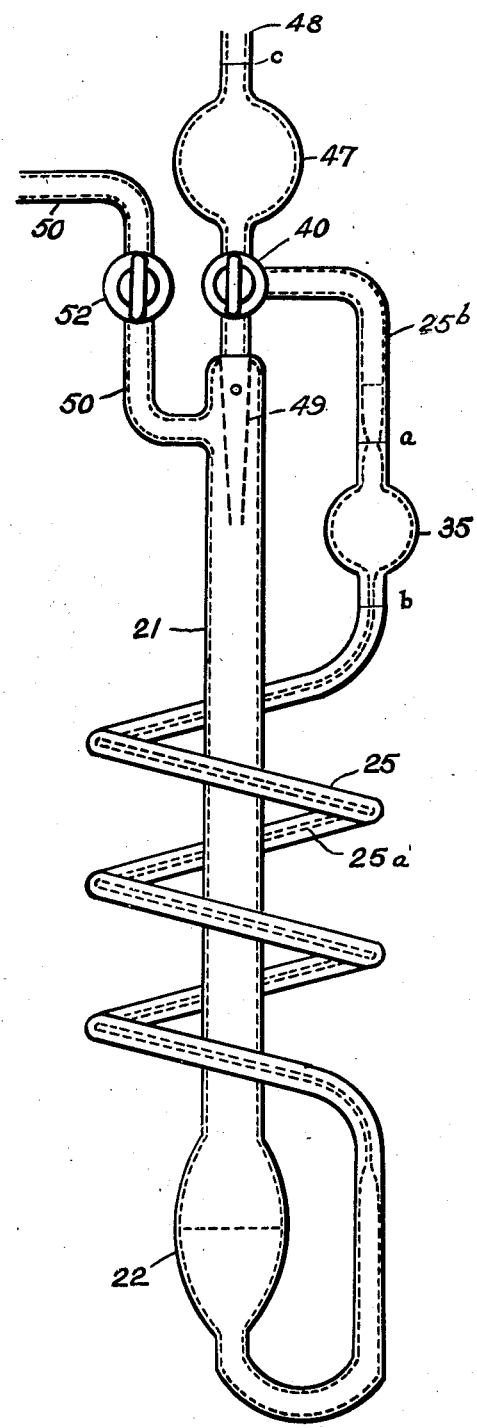
Figure 2 illustrates an instrument adapted for very close measurements of low viscosity liquids.

Referring more particularly to Figure 2 of the drawing, the instrument illustrated includes all parts described in the more simple form, Figure 1, except that the length of the capillary which again should have an inside bore of not less than .35 millimeter, is much greater and disposed in any convenient convolute or helical course between its end points, so as to provide conveniently slow out-flow of liquids of low viscosity. Since most liquids of low viscosity possess high vapour pressure, provision for conducting the measurements under hermetic conditions may be made as set forth under "Operation" and as illustrated in Figure 2.

*Operation*

A measured amount of liquid is introduced into the feeder tube 21 and the bulb 22 through the calibrated pipette 47 and the three-way cock 40. The cock 40 is then set to communicate between the bulb 35 and the pipette 47. Slight air or gas pressure is applied through the tube 50 by opening the cock 52 until the liquid rises through the capillary above the bulb 35 to a point above the mark "a." The lower surface of the liquid will lie within the bulb 22. The cock 52 is then closed and the cock 40 turned so as to join the space above the two levels of the liquid and to seal it from the outside. The time of passage of the meniscus from a to b is registered. The viscosity is then determined by comparing the outflow time with that of a liquid of known viscosity. In viscosity measurements of this type, a viscometer according to the present invention has been found to be twelve times more sensitive than an Ostwald pipette.

EXAMPLE

The following example in which a characteristic procedure is carried out on a preferred type of viscometer according to the invention in comparison with a similar procedure on a standard viscometer of the same capacity further illustrates the invention. This example should not be taken as limiting the scope of the disclosure but only as illustrative.

The following comparison was made between a viscometer of the type illustrated in Figure 1 and a commercial Ostwald pipette. The figures of the drawing are used for convenience to identify the parts of the former. The applicant's viscometer had a capillary of .45 millimeter inside diameter and 600 millimeters in length, shaped into a helix of 120 millimeters in height. The Ostwald pipette had a straight vertical capillary of .50 millimeter bore and 90 millimeters length. The applicant's viscometer gave accurate readings of a viscosity of 0.223 centipoise (acetaldehyde at 20° C.). The Ostwald pipette showed a positive error of more than 7% with the same test liquid.

ADVANTAGES

One skilled in the art will realize the advantages of the devices according to the applicant's invention. They permit the convenient handling of liquids of low boiling point which may be kept under pressure if desired. Their compactness for a given capacity and sensitivity allows accurate determinations of low viscosity liquids down to the finest limits. Their relatively compact nature also makes them particularly suitable for use alone in the customary water bath or in combination with a thermostatic device. Many other advantages will be evident.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

I claim:

1. A viscometer of the outflow type, comprising, an upright capillary tube, a recipient vessel having a connection with the lower end of said capillary tube, a calibrated bulb having a connection with the upper end of said capillary tube, a passage adapting said recipient vessel to be connected with a pressure source, portions of said capillary tube above the recipient vessel being circuitous thereby to present a circumfluent path to liquid passing from the calibrated bulb to the recipient vessel.

2. A viscometer as claimed in claim 1, wherein the capillary is of spiral form.

3. A viscometer of the outflow type, comprising, a bulb calibrated for the observation of the passage of a certain volume of liquid and a recipient vessel adapted to receive the liquid, a capillary tube extending between said bulb and said vessel, the capillary tube having a length considerably greater than the vertical distance between the bulb and the recipient vessel, a calibrated pipette, a connection between said pipette and said recipient vessel, a connection between said pipette and said calibrated bulb, a three-way cock controlling said connections whereby the pipette may be connected to or disconnected from either the recipient vessel or the calibrated bulb, a pressure inlet to said recipient vessel, and a cock for controlling said pressure inlet whereby pressure may be introduced to said recipient vessel or the latter may be cut off from the atmosphere.

4. A viscometer of the outflow type, comprising, a bulb calibrated for the observation of the passage of a certain volume of liquid and a recipient vessel adapted to receive the liquid, a capillary tube extending between said bulb and said vessel, the capillary tube having a length considerably greater than the vertical distance between the bulb and the recipient vessel, a calibrated pipette, a connection between said pipette and said calibrated bulb, means for controlling said connections whereby the pipette may be connected to or disconnected from either the recipient vessel or the calibrated bulb, a pressure inlet to said recipient vessel, and means for controlling said pressure inlet whereby pressure may be introduced to said recipient vessel or the latter may be cut off from the atmosphere.

5. A viscometer of the outflow type, comprising, an upright capillary tube, a recipient vessel having a connection with the lower end of said capillary tube, a calibrated bulb having a connection with the upper end of said capillary tube, a passage adapting said recipient vessel to be connected with a pressure source, portions of said capillary tube above the recipient vessel being circuitous thereby to present a circumfluent path to liquid passing from the calibrated bulb to the recipient vessel, at least a portion of said capillary being so disposed that it has an inclination of less than 45° towards the horizontal when the viscometer is in operative position.

ERNEST PAUL IRANY.